United States Patent
Sakai (10) Patent No.: US 10,549,682 B2
(45) Date of Patent: Feb. 4, 2020

(54) PARKING ASSISTANCE DEVICE

(71) Applicant: TOYOTA JIDOSHA KABUSHIKI KAISHA, Toyota-shi, Aichi-ken (JP)

(72) Inventor: Yuichi Sakai, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 274 days.

(21) Appl. No.: 15/660,404

(22) Filed: Jul. 26, 2017

(65) Prior Publication Data

US 2018/0037160 A1 Feb. 8, 2018

(30) Foreign Application Priority Data

Aug. 2, 2016 (JP) .................................. 2016-151774

(51) Int. Cl.
*B60Q 1/48* (2006.01)
*B60Q 1/08* (2006.01)
*B60Q 1/14* (2006.01)
*B62D 15/02* (2006.01)

(52) U.S. Cl.
CPC .............. *B60Q 1/482* (2013.01); *B60Q 1/085* (2013.01); *B60Q 1/143* (2013.01); *B62D 15/0285* (2013.01); *B60Q 2300/054* (2013.01); *B60Q 2300/314* (2013.01); *B60Q 2300/45* (2013.01)

(58) Field of Classification Search
CPC ........ B60Q 1/085; B60Q 1/143; B60Q 1/482; B60Q 2300/054; B60Q 2300/314; B60Q 2300/45; B62D 15/0285

USPC ............................................................. 701/2
See application file for complete search history.

(56) References Cited

U.S. PATENT DOCUMENTS

| 10,279,840 B2 * | 5/2019 | Nordbruch ......... B62D 15/0285 |
| 2014/0074352 A1 * | 3/2014 | Tate, Jr. ............... B62D 15/028 701/36 |
| 2014/0214260 A1 * | 7/2014 | Eckert .................... B60Q 1/488 701/28 |

FOREIGN PATENT DOCUMENTS

| JP | 2007-038826 A | 2/2007 |
| JP | 2011-025895 A | 2/2011 |
| JP | 2011-218863 A | 11/2011 |

* cited by examiner

*Primary Examiner* — Anthony R Jimenez
(74) *Attorney, Agent, or Firm* — Sughrue Mion, PLLC (57) ABSTRACT

A parking assistance device includes at least one electronic control unit configured to execute parking assistance according to an operation from a user, such that a vehicle is automatically parked at a target position. The at least one electronic control unit is configured to determine whether or not the vehicle is in a predetermined environment which is darker than a predetermined brightness level. The at least one electronic control unit is configured to, when the at least one electronic control unit determines that the vehicle is in the predetermined environment, control a lighting device which is provided in the vehicle such that the lighting device is lighted without performing lighting with a high beam, while the parking assistance is executed.

9 Claims, 6 Drawing Sheets

PARKING ASSISTANCE DEVICE

INCORPORATION BY REFERENCE

The disclosure of Japanese Patent Application No. 2016-151774 filed on Aug. 2, 2016 including the specification, drawings and abstract is incorporated herein by reference in its entirety.

BACKGROUND

1. Technical Field

The present disclosure relates to a parking assistance device.

2. Description of Related Art

An example of a parking assistance device is described in Japanese Unexamined Patent Application Publication No. 2011-218863 (JP 2011-218863 A). Specifically, JP 2011-218863 A describes a parking assistance device which performs parking assistance for automatically parking a vehicle at a target position by automatically moving the vehicle along a moving route from a current position of the vehicle to the target position for parking the vehicle based on an instruction of a user (for example, a driver) using a remote device from the outside of the vehicle.

Examples of technical literature related to the present disclosure include Japanese Unexamined Patent Application Publication No. 2007-038826 (JP 2007-038826 A), although it is not a literature in which a parking assistance device is described. JP 2007-038826 A describes a vehicle headlight control device which automatically switches between a high beam and a low beam according to whether or not another vehicle is positioned in front of a vehicle.

SUMMARY

While the above-described parking assistance is being performed, the user who actually performs operation for the parking assistance, by using the remote device, is outside the vehicle. For this reason, the user recognizes the vehicle from the outside of the vehicle. However, since the periphery of the vehicle becomes relatively dark in nighttime, there is a possibility that the user cannot recognize the vehicle. Alternatively, in addition to nighttime, under a situation in which the vehicle is in a relatively dark environment, there is a possibility that the user cannot recognize the vehicle.

In addition to the user, for a person around the vehicle, it should be preferable that the person recognizes the vehicle in order to secure the safety of the person. Under a situation in which the vehicle is in a relatively dark environment, there is a possibility that not only the user who actually performs operation for the parking assistance, but also a person, who does not performs operation for the parking assistance, cannot recognize the vehicle.

Accordingly, in order to allow the user or the person around the vehicle to recognize the vehicle under a situation in which the vehicle is in a relatively dark environment, it is considered that a countermeasure for turning on lighting means provided in the vehicle (for example, headlights, wind indicators, interior lights, blinkers, fog lights, backlights, or the like) is employed. However, if the headlights among the lighting means provided in the vehicle are turned on with a high beam, since the user or the person around the vehicle feels glaring due to the high beam, there is a possibility that the user or the person around the vehicle cannot directly view the vehicle. As a result, there is a possibility that the user or the person around the vehicle cannot appropriately recognize the vehicle.

The present disclosure provides a parking assistance device capable of allowing a user or a person around a vehicle in parking assistance to appropriately recognize the vehicle even under a situation in which the vehicle is in a relatively dark environment.

An aspect of the disclosure provides a parking assistance device. The parking assistance device according to the aspect includes at least one electronic control unit. The at least one electronic control unit is configured to execute parking assistance according to an operation from a user, such that a vehicle is automatically parked at a target position. The at least one electronic control unit is configured to determine whether or not the vehicle is in a predetermined environment darker than a predetermined brightness level. The at least one electronic control unit is configured to, when the at least one electronic control unit determines that the vehicle is in the predetermined environment, control a lighting device provided in the vehicle such that the lighting device is lighted without performing lighting with a high beam, while the parking assistance is executed.

With the parking assistance device of the present disclosure, under a situation in which the vehicle is in a relatively dark environment (that is, the predetermined environment), the lighting device is lighted. However, since lighting with the high beam is not performed, the lighting device is not lighted with a high beam. For this reason, it is possible to allow the user or the person around the vehicle to recognize the vehicle in the parking assistance without feeling glaring due to a high beam.

In the aspect of the disclosure, the at least one electronic control unit may be configured to, while the parking assistance is executed, control the lighting device such that the lighting device which has not been turned on before the at least one electronic control unit determines that the vehicle is in the predetermined environment is newly turned on.

According to this aspect, the lighting device which is not turned on before is newly turned on, whereby it is possible to allow the user or the person around the vehicle to recognize the vehicle in the parking assistance without feeling glaring due to a high beam.

In the aspect of the disclosure, the at least one electronic control unit may be configured to, while the parking assistance is executed, control the lighting device such that the lighting device is lighted in a second lighting mode different from a first lighting mode, which is performed before the at least one electronic control unit determines that the vehicle is in the predetermined environment, when the lighting device is already turned on before the at least one electronic control unit determines that the vehicle is in the predetermined environment.

According to this aspect, the lighting device which is already turned on is lighted in a lighting mode that is different from the already performed lighting mode. Thus it is possible to allow the user or the person around the vehicle to recognize the vehicle in the parking assistance without feeling glaring due to a high beam.

In the aspect of the disclosure, the at least one electronic control unit may be configured to, while the parking assistance is executed, control the lighting device such that a lighting mode of the lighting device is changed according to a state of the vehicle during a period in which the lighting device is lighted due to a determination that the vehicle is in the predetermined environment.

According to this aspect, it is possible to allow the user or the person around the vehicle to recognize a state of the vehicle in the parking assistance (for example, how the vehicle is moving), based on the difference between the lighting modes of the lighting device.

In the aspect of the disclosure, the lighting mode may include at least one of lighting color, flickering cycle, and brightness of the lighting device.

In the aspect of the disclosure, the at least one electronic control unit may be configured to, while the parking assistance is executed, control the lighting device such that the lighting device irradiates, with light, the target position or a position where the vehicle passes by a time at which the vehicle arrives at the target position.

According to this aspect, it is possible to allow the user or the person around the vehicle to recognize the presence of the target position or the via-positions in a direction in which the lighting device emits light.

In the aspect of the disclosure, the at least one electronic control unit may be configured to, while the parking assistance is executed, control the lighting device such that the lighting device irradiates an obstacle with light, the obstacle being positioned on a traveling route of the vehicle or near the traveling route, the traveling route being a route where the vehicle moves on by a time at which the vehicle arrives at the target position.

In the aspect of the disclosure, the at least one electronic control unit may be configured to inhibit lighting with the high beam while the parking assistance is executed.

In the aspect of the disclosure, the lighting device may include a headlight, and the at least one electronic control unit may be configured to, while the parking assistance is executed, control the headlight such that the headlight is lighted when the vehicle is moving, and control the headlight such that the headlight is not lighted when the vehicle is not moving.

In the aspect of the disclosure, the parking assistance device may further include a remote terminal. The remote terminal may be configured to communicate with the at least one electronic control unit from an outside of the vehicle. The at least one electronic control unit may be configured to execute the parking assistance on the vehicle, according to the operation from the user on the remote terminal, by communicating with the remote terminal.

In the aspect of the disclosure, the remote terminal may include a sensor configured to detect brightness in a periphery of the remote terminal, and the at least one electronic control unit may be configured to, while the parking assistance is executed, control the lighting device based on a detection result of the sensor.

According to this aspect, it is possible to allow the user or the person around the vehicle to recognize the presence of the obstacle in a direction in which the lighting means emits light.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, an embodiment of a parking assistance device will be described referring to the drawings. The following description will be provided using a vehicle 1 in which the embodiment of the parking assistance device is mounted.

(1) Configuration of Vehicle 1

Figure 1:
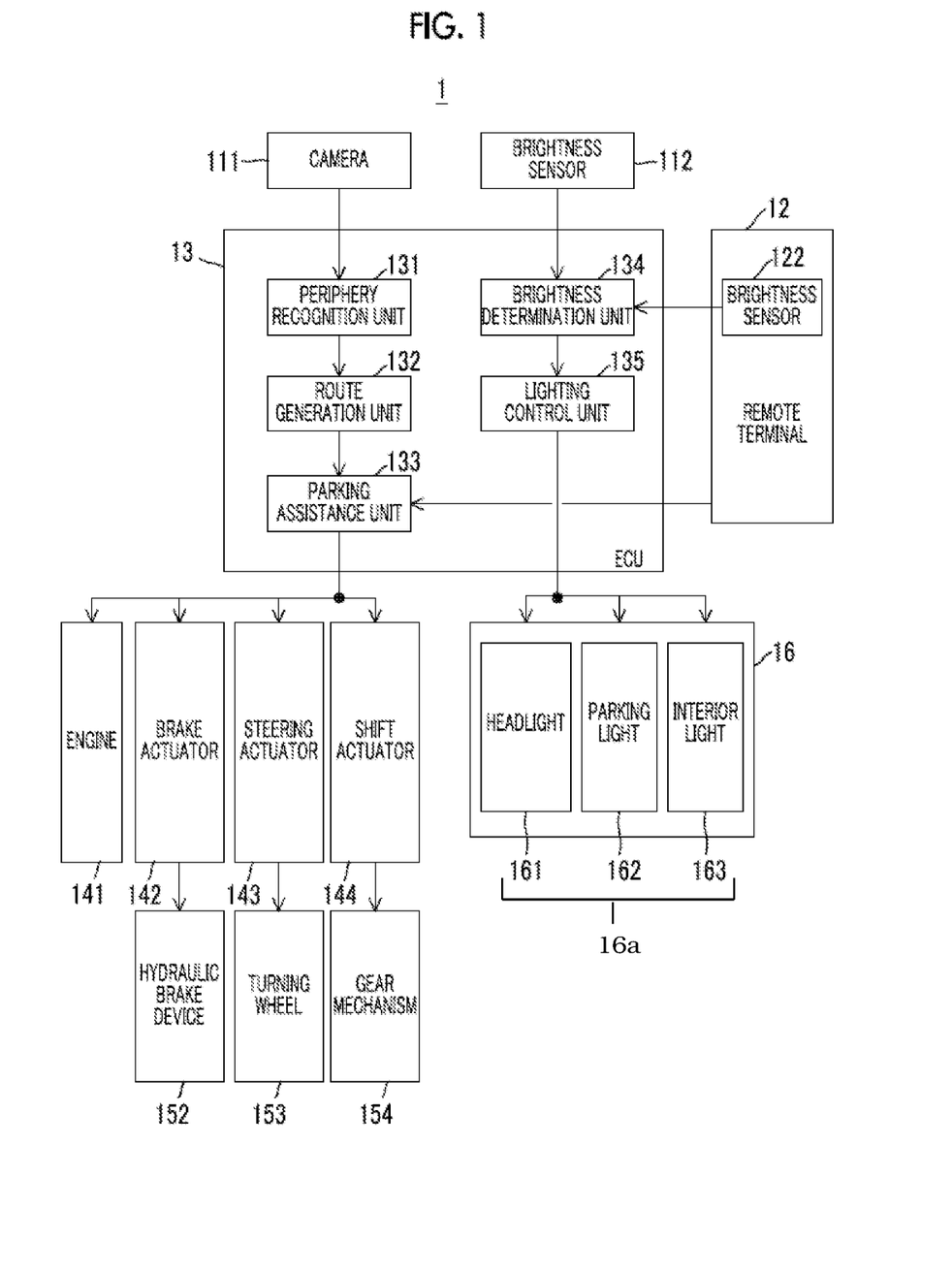
FIG. 1 is a block diagram showing the configuration of a vehicle of this embodiment.

First, the configuration of the vehicle 1 of this embodiment will be described referring to FIG. 1. As shown in FIG. 1, the vehicle 1 includes a camera 111, a brightness sensor 112, an electrical control unit (ECU) 13 which is a specific example of the "parking assistance device" described above, an engine 141, a brake actuator 142, a steering actuator 143, a shift actuator 144, a hydraulic brake device 152, turning wheels 153, a gear mechanism 154, and lights 16 which are specific examples of "lighting device".

The camera 111 is an imaging apparatus which images the periphery of the vehicle 1. The brightness sensor 112 can detect brightness (for example, illuminance or the like) in the periphery of the vehicle 1.

The ECU 13 controls the overall operation of the vehicle 1. In this embodiment, in particular, the ECU 13 performs a parking assistance operation to automatically park the vehicle 1 at a target position (for example, a parking lot, a parking section in the parking lot, a parking section on a road, or the like). In addition, the ECU 13 performs a lighting control operation. With the lighting control operation, the lights 16 are lighted in parallel with the parking assistance operation such that the user or the person around the vehicle can appropriately recognize the vehicle 1 in a case where the vehicle 1 is in an environment (hereinafter, appropriately referred to as a "dark environment") which is darker than a predetermined brightness level.

The ECU 13 performs the parking assistance operation (in addition, the lighting control operation) according to an operation of a user (typically, a driver) using a remote terminal 12. Specifically, the remote terminal 12 is a small apparatus which can be carried with the user and is communicable with the ECU 13. The remote terminal 12 has an operation button which is pressed by the user in a case where the user requests the execution of the parking assistance operation. The remote terminal 12 gives notification of the press result of the operation button to the ECU 13. The ECU 13 starts the parking assistance operation in a case where the operation button which is not pressed before is newly pressed. The ECU 13 continues the parking assistance operation while the operation button is being pressed. The ECU 13 ends the parking assistance operation in a case where the operation button which is pressed before is released.

Since the user can request the execution of the parking assistance operation using the remote terminal 12, in this embodiment, it is assumed that the user mostly operates the remote terminal 12 from the outside of the vehicle 1 to request the execution of the parking assistance operation. However, the user may operate the remote terminal 12 from the inside (for example, the cabin) of the vehicle 1 to request the execution of the parking assistance operation.

The remote terminal 12 includes a brightness sensor 122, in addition to the operation button. The brightness sensor 122 can detect brightness (for example, illuminance or the like) in the periphery of the remote terminal 12. The user operates the remote terminal 12 near the vehicle 1. Accordingly, it can be said that the brightness sensor 122 can substantially detect brightness in the periphery of the vehicle 1.

In order to perform the parking assistance operation and the lighting control operation, the ECU 13 includes, as processing blocks logically implemented or physically implemented inside the ECU 13, a periphery recognition unit 131, a route generation unit 132, a parking assistance unit 133, a brightness determination unit 134, and a lighting control unit 135.

Figure 2:
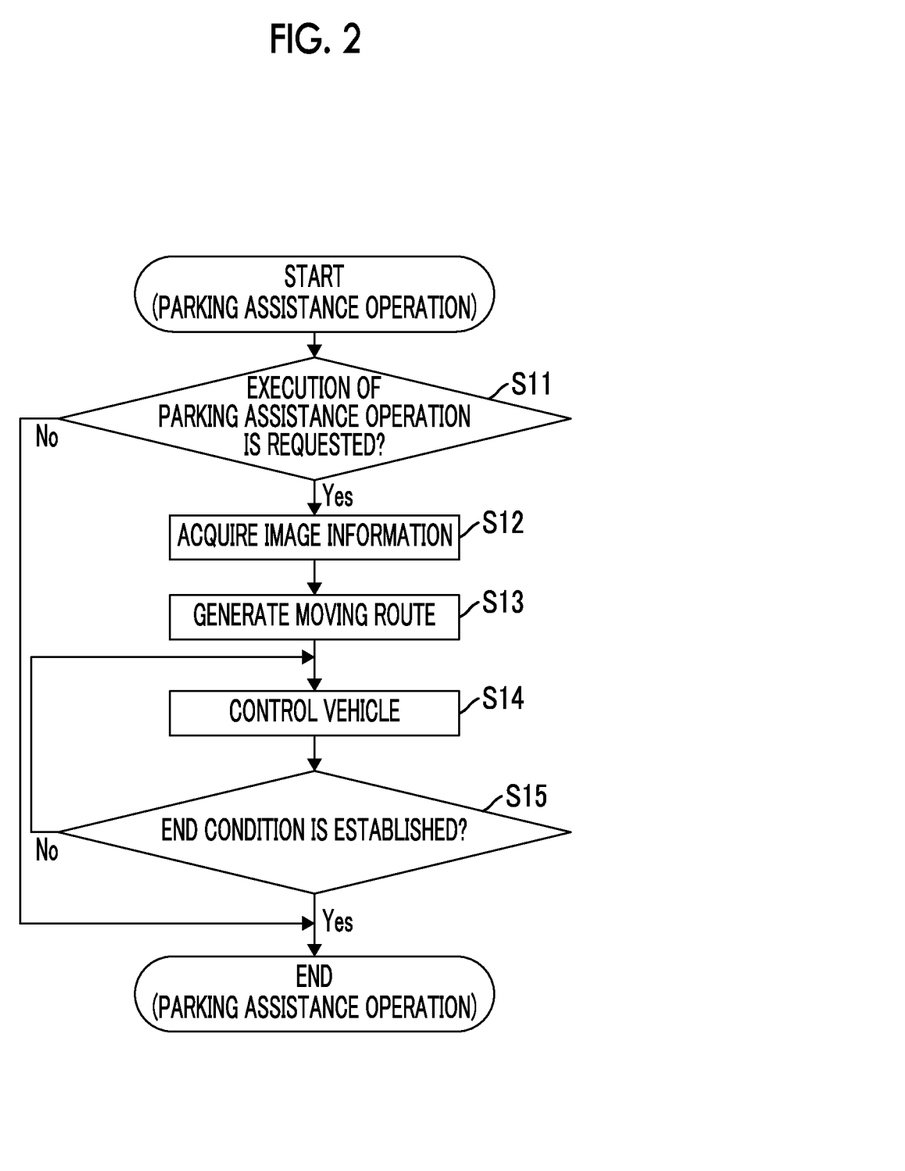
FIG. 2 is a flowchart showing the flow of a parking assistance operation of this embodiment.

While the operations of the periphery recognition unit 131 to the lighting control unit 135 will be described below referring to FIG. 2 or the like, the outline will be described below simply. The periphery recognition unit 131 recognizes a situation in the periphery of the vehicle 1 based on image information which is an imaging result of the camera 111. The route generation unit 132 generates (in other words, calculates) a moving route for movement of the vehicle 1 from a current position of the vehicle 1 to the target position based on a recognition result of the periphery recognition unit 131. The parking assistance unit 133 controls the engine 141, the brake actuator 142, the steering actuator 143, and the shift actuator 144 such that the vehicle 1 automatically moves along the moving route generated by the route generation unit 132. The brightness determination unit 134 determines whether or not the vehicle 1 is in the dark environment based on at least one of first brightness information as a detection result of the brightness sensor 112 or second brightness information as a detection result of the brightness sensor 122. The lighting control unit 135 turns on the lights 16 based on a determination result of the brightness determination unit 134.

The engine 141 is a drive source which supplies drive power to drive wheels (at least a part of wheels) (not shown). The engine 141 can regulate drive power supplied to the drive wheels under the control of the parking assistance unit 133. The brake actuator 142 performs control such that the hydraulic brake device 152 capable of braking the wheels (not shown) gives braking force to the vehicle 1 under the control the parking assistance unit 133. The steering actuator 143 turns the turning wheels 153 capable of being turned such that the vehicle 1 moves toward in a desired direction under the control of the parking assistance unit 133. The shift actuator 144 performs control such that the gear mechanism 154 switches a gear range of a gear mechanism (so-called transmission) 154 capable of transmitting the power of the engine 141 to the drive wheels is switched to a desired gear range under the control of the parking assistance unit 133.

The lights 16 are turned on or off under the control of the lighting control unit 135. In this embodiment, the lights 16 include headlights (that is, front lights) 161 which primarily illuminate the front of the vehicle 1, parking lights (that is, wind indicators) 162 which primarily indicate the standard of the size of the vehicle 1, and interior lights 163 which primarily illuminate the cabin of the vehicle 1. However, the lights 16 may include other lights (for example, at least one of blinkers (that is, direction indicators), fog lights, or taillights), in addition to or instead of at least one of the headlights 161, the parking lights 162, or the interior lights 163.

(2) Operation of ECU 13

Subsequently, a parking assistance operation and a lighting control operation which are performed by the ECU 13 will be described in order.

(2-1) Flow of Parking Assistance Operation

First, the flow of the parking assistance operation will be described referring to the flowchart of FIG. 2. As shown in FIG. 2, the parking assistance unit 133 communicates with the remote terminal 12 to determine whether or not the user requests the execution of the parking assistance operation (Step S11). Specifically, the parking assistance unit 133 determines whether or not the user presses the operation button of the remote terminal 12. In a case where the user presses the operation button of the remote terminal 12, the parking assistance unit 133 determines that the user requests the execution of the parking assistance operation.

As a result of the determination in Step S11, in a case where it is determined that the user does not request the execution of the parking assistance operation (Step S11: No), the ECU 13 ends the parking assistance operation shown in FIG. 2. In a case where the parking assistance operation shown in FIG. 2 ends, the ECU 13 starts the parking assistance operation shown in FIG. 2 again after a first predetermined period has elapsed.

As a result of the determination in Step S11, in a case where it is determined that the user requests the execution of the parking assistance operation (Step S11: Yes), the periphery recognition unit 131 acquires imaging information as an imaging result of the camera 111 from the camera 111 (Step S12). Thereafter, the route generation unit 132 generates the moving route for movement of the vehicle 1 from the current position of the vehicle 1 to the target position based on the imaging information acquired in Step S12 (Step S13). Detailed description of a generation method of the moving route based on the imaging information will be omitted since an existing generation method (for example, the generation method described in JP 2011-218863 A or the like) may be employed.

Thereafter, the parking assistance unit 133 controls the engine 141, the brake actuator 142, the steering actuator 143, and the shift actuator 144 to automatically move the vehicle 1 along the moving route generated in Step S13 (Step S14). That is, the parking assistance unit 133 controls the engine 141, controls the hydraulic brake device 152 through the brake actuator 142, controls the turning wheels 153 through the steering actuator 143, and controls the gear mechanism 154 through the shift actuator 144 to automatically move the vehicle 1 (Step S14).

While the parking assistance unit 133 automatically moves the vehicle 1, the parking assistance unit 133 determines whether or not an end condition for ending the parking assistance operation is established (Step S15). The end condition may include a first condition that the vehicle 1 reaches the target position. The end condition may include a second condition that the user does not request the execution of the parking assistance operation (that is, the user does not press the operation button of the remote terminal 12). The end condition may include a third condition that failure making the parking assistance operation hard or unable to be continued occurs or is likely to occur in the vehicle 1.

As a result of the determination in Step S15, in a case where it is determined that the end condition is established (Step S15: Yes), the ECU 13 ends the parking assistance operation shown in FIG. 2. As a result of the determination in Step S15, in a case where it is determined that the end condition is not established (Step S15: No), the operation after Step S14 is repeated. That is, the parking assistance unit 133 continues to automatically move the vehicle 1.

(2-2) Flow of Lighting Control Operation

Figure 3:
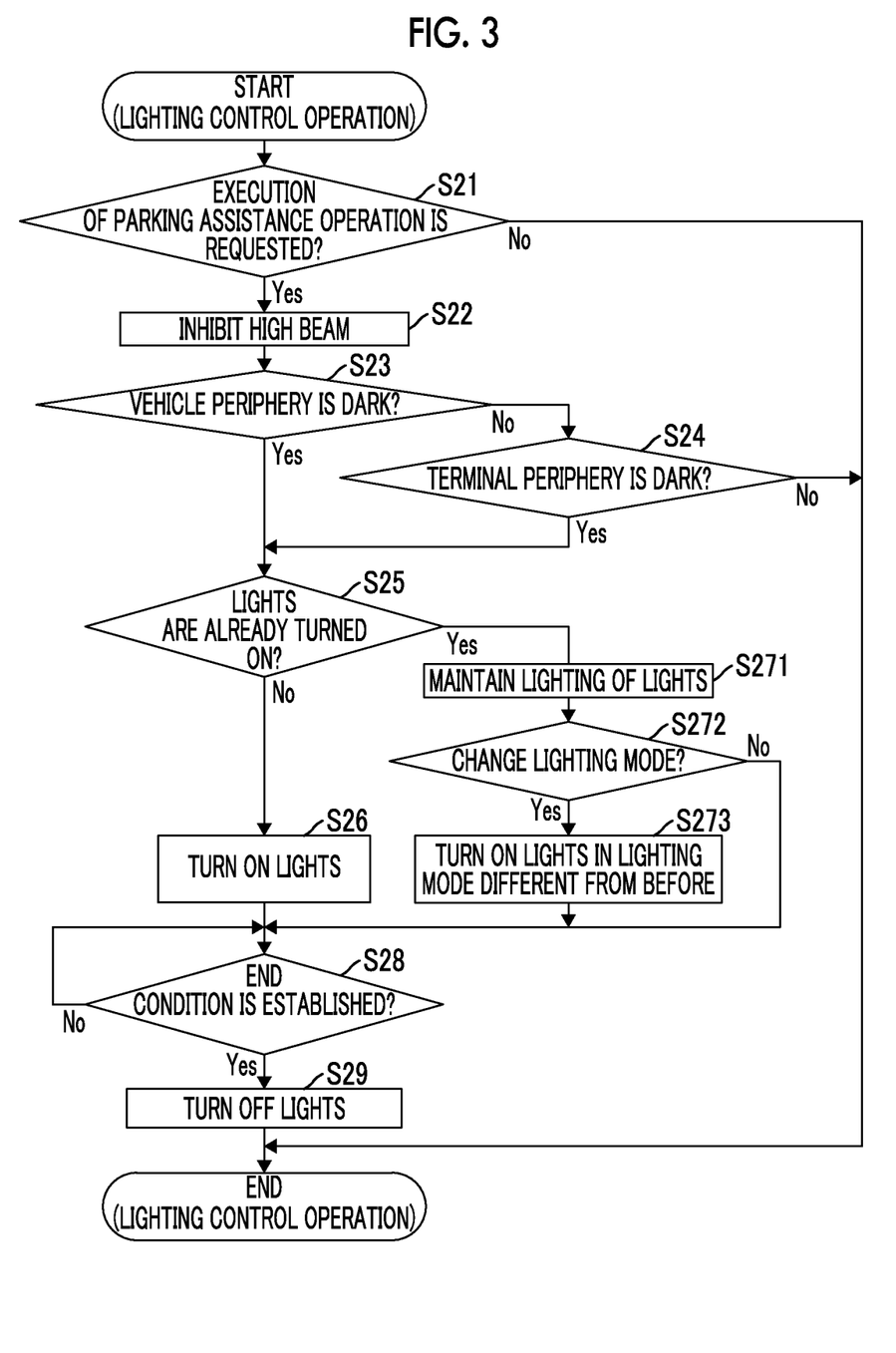
FIG. 3 is a flowchart showing the flow of a lighting control operation of this embodiment.

Subsequently, the flow of the lighting control operation will be described referring to the flowchart of FIG. 3. As shown in FIG. 3, even in the lighting control operation, similarly to the parking assistance operation, the parking assistance unit 133 communicates with the remote terminal 12 to determine whether or not the user requests the execution of the parking assistance operation (Step S21).

As a result of the determination in Step S21, in a case where it is determined that the user does not request the execution of the parking assistance operation (Step S21: No), since the parking assistance operation is not performed, the lighting control operation does not need to be performed. For this reason, the ECU 13 ends the lighting control operation shown in FIG. 3. In a case where the lighting control operation shown in FIG. 3 ends, the ECU 13 starts the lighting control operation shown in FIG. 3 again after a second predetermined period has elapsed.

As a result of the determination in Step S21, in a case where it is determined that the user requests the execution of the parking assistance operation (Step S21: Yes), the lighting control unit 135 inhibits lighting of the headlights 161 with a high beam (Step S22). Accordingly, while the parking assistance operation is being performed, the headlights 161 are not turned on with a high beam by the lighting control operation. In this embodiment, the term "high beam" means a lighting mode of the headlights 161 in which light can be emitted relatively upward so as to illuminate a forward area compared to a low beam in which light is emitted relatively downward in order to reduce glaring to an oncoming vehicle or a preceding vehicle. That is, there are at least a low beam and a high beam as the lighting mode of the headlights 161, the low beam is a lighting mode in which light is emitted downward not to illuminate a far area compared to the high beam, and the high beam is a lighting mode in which light is emitted upward to illuminate a farther area compared to the low beam.

Thereafter, the brightness determination unit 134 determines whether or not the periphery of the vehicle 1 is relatively dark based on the first brightness information as a detection result of the brightness sensor 112 (Step S23). Specifically, the brightness determination unit 134 determines whether or not brightness in the periphery of the vehicle 1 indicated by the first brightness information is darker than a predetermined brightness level. In a case where brightness in the periphery of the vehicle 1 is darker than the predetermined brightness level, the brightness determination unit 134 determines that the periphery of the vehicle 1 is relatively dark. The predetermined brightness level is a control parameter set in advance, but may be appropriately set by the brightness determination unit 134. The predetermined brightness level is set to brightness for distinguishing between a state in which the periphery of the vehicle 1 is bright to such an extent that the user can appropriately recognize the vehicle 1 even in a situation in which the lights 16 are not lighted and a state in which the periphery of the vehicle 1 is dark to such an extent that the user is hard or unable to appropriately recognize the vehicle 1 in a situation in which the lights 16 are not lighted.

The brightness determination unit 134 determines whether or not the periphery of the remote terminal 12 is relatively dark based on the second brightness information as a detection result of the brightness sensor 122 (Step S24). Specifically, the brightness determination unit 134 determines whether or not brightness in the periphery of the remote terminal 12 indicated by the second brightness information is darker than the predetermined brightness level. In a case where brightness in the periphery of the remote terminal 12 is darker than the predetermined brightness level, the brightness determination unit 134 determines that the periphery of the remote terminal 12 is relatively dark.

As described above, considering that the user usually operates the remote terminal 12 near the vehicle 1, brightness in the periphery of the remote terminal 12 indicated by the second brightness information is substantially equivalent to brightness in the periphery of the vehicle 1 indicated by the first brightness information. For this reason, in a case where brightness in the periphery of the remote terminal 12 is darker than the predetermined brightness level, there is a relatively high possibility that brightness in the periphery of the vehicle 1 is darker than the predetermined brightness level.

In a case where the vehicle 1 is positioned at a relatively bright place and the user is positioned at a relatively dark place, brightness in the periphery of the remote terminal 12 indicated by the second brightness information is different from brightness in the periphery of the vehicle 1 indicated by the first brightness information. However, in a case where the vehicle 1 is positioned at a relatively bright place and the user is positioned at a relatively dark place, there is a relatively high possibility that the vehicle 1 automatically moves from the relatively bright place toward the relatively dark place by the parking assistance operation. This is because there is a relatively high possibility that the user requests the execution of the parking assistance operation without recognizing the vehicle 1 at all, and as a result, there is a relatively high possibility that the target position is near a place where the user is positioned. Accordingly, brightness in the periphery of the remote terminal 12 indicated by the second brightness information is substantially equivalent to brightness at a place where the vehicle 1 is supposed to be positioned in the future by the parking assistance operation. Therefore, an operation in Step S24 to determine whether or not brightness in the periphery of the remote terminal 12 is darker than the predetermined brightness level is equivalent to an operation to determine whether or not brightness in the periphery of the vehicle 1 is darker (specifically, darker at the present time or darker in the future) than the predetermined brightness level.

Even in a case where the vehicle 1 is positioned at a relatively dark place and the user is positioned at a relatively bright place, brightness in the periphery of the remote terminal 12 indicated by the second brightness information is different from brightness in the periphery of the vehicle 1 indicated by the first brightness information. However, in this case, since it is directly determined that brightness in the periphery of the vehicle 1 is relatively dark, the brightness determination unit 134 may not perform the determination operation (Step S24) based on the second brightness information.

As a result of the determinations in Steps S23 and S24, in a case where it is determined that the periphery of the vehicle 1 is not relatively dark and the periphery of the remote terminal 12 is not relatively dark (Step S23: No and Step S24: No), it is estimated that the periphery of the vehicle 1 is relatively bright. Accordingly, the brightness determination unit 134 determines that the vehicle 1 is not in the dark environment. In other words, the brightness determination unit 134 determines that the vehicle 1 is in an environment (hereinafter, appropriately referred to as a "bright environment") which is brighter than the predetermined brightness level. In this case, even if the lights 16 are not turned on, the user should recognize the vehicle 1 in the parking assistance operation. Therefore, the necessity of performing the lighting control operation is relatively small. For this reason, the ECU 13 ends the lighting control operation shown in FIG. 3.

As a result of the determinations in Steps S23 and S24, in a case where it is determined that the periphery of the vehicle 1 is relatively dark or the periphery of the remote terminal 12 is relatively dark (Step S23: Yes or Step S24: Yes), it is estimated that the periphery of the vehicle 1 is relatively dark (specifically, already dark at the present time or becomes dark in the future). Therefore, the brightness determination unit 134 determines that the vehicle 1 is in the dark environment. In this case, there is a possibility that the user cannot recognize the vehicle 1 in the parking assistance operation. For this reason, the lighting control unit 135 turns on the lights 16.

In order to turn on the lights 16, first, the lighting control unit 135 determines whether or not the lights 16 are already turned on (Step S25). Specifically, the lighting control unit 135 determines whether or not at least a part of lights (hereinafter, lighting target lights 16a) to be turned on in order to make the user recognize the vehicle 1 among the lights 16 are already turned on. The lighting target lights 16a include at least one of the headlights 161, the parking lights 162, or the interior lights 163. For example, in a case where the headlights 161 are the lighting target lights 16a, the lighting control unit 135 determines whether or not the headlights 161 are already turned on. The same applies to a case where the parking lights 162 or the interior lights 163 are the lighting target lights 16a. The lighting target lights 16a may be determined in advance or may be appropriately determined by the lighting control unit 135.

As a result of the determination in Step S25, in a case where it is determined that the lighting target lights 16a are not yet turned on (that is, turned off) (Step S25: No), the lighting control unit 135 controls the lighting target lights 16a such that the lighting target lights 16a which are turned off before are newly turned on (Step S26). For example, in a case where the lighting target lights 16a are the headlights 161, the lighting control unit 135 controls the lighting target lights 16a such that the headlights 161 are turned on with the low beam. For example, in a case where the lighting target lights 16a are the parking lights 162 or the interior lights 163, the lighting control unit 135 controls the lighting target lights 16a such that the parking lights 162 or the interior lights 163 are turned on. As a result, the user can recognize the vehicle 1 in the parking assistance operation with the help of light of the lighting target lights 16a.

As a result of the determination in Step S25, in a case where it is determined that the lighting target lights 16a are already turned on (Step S25: Yes), since the lighting target lights 16a are already turned on, the user can recognize the vehicle 1 in the parking assistance operation with the help of light of the lighting target lights 16a. For this reason, the lighting control unit 135 controls the lighting target lights 16a such that the lighting target lights 16a which are already turned on remain lighted (that is, not turned off) (Step S271).

In a case where the brightness of the lighting target lights 16a which are already turned on are relatively dark (specifically, dark to such an extent that it is hard or unable for user to appropriately recognize the state of the vehicle 1), if the lighting target lights 16a merely remain lighted in the same lighting mode (in other words, lighting pattern) as before, there is a possibility that the user cannot recognize the vehicle 1 in the parking assistance operation with the help of light of the lighting target lights 16a. Alternatively, in a situation in which the lighting target lights 16a remain lighted before the parking assistance operation starts, if the lighting target lights 16a which are already turned on merely remain lighted in the same lighting mode as before, there is a possibility that the user can recognize the vehicle 1 itself, but worries about whether or not the parking assistance operation is actually performed by an operation using the remote terminal 12.

Accordingly, the lighting control unit 135 determines whether or not to change the lighting mode of the lighting target lights 16a in a case of controlling the lighting target lights 16a such that the lighting target lights 16a which are already turned on remain lighted (Step S272). For example, the lighting control unit 135 may determine whether or not the brightness of the lighting target lights 16a is darker than a brightness level capable of distinguishing between a situation in which the user can recognize the vehicle 1 with the help of light of the lighting target lights 16a and a situation in which the user cannot recognize the vehicle 1 with the help of light of the lighting target lights 16a. The lighting control unit 135 may determine to change the lighting mode of the lighting target lights 16a in a case where the brightness of the lighting target lights 16a is dark. Alternatively, for example, the lighting control unit 135 may determine to change the lighting mode of the lighting target lights 16a in a case where the user requests notification of the parking assistance operation being actually executed by an operation using the remote terminal 12 to the user by an initial setting or an operation of the remote terminal 12.

As a result of the determination in Step S272, in a case where it is determined to change the lighting mode of the lighting target lights 16a (Step S272: Yes), the lighting control unit 135 controls the lighting target lights 16a such that the lighting target lights 16a are lighted in a lighting mode different from a lighting mode before it is determined that the periphery of the vehicle 1 or the remote terminal 12 is dark (Step S273). As a result of the determination in Step S272, in a case where it is determined not to change the lighting mode of the lighting target lights 16a (Step S272: No), the lighting control unit 135 may not perform the processing of Step S273. In this case, the lighting control unit 135 may control the lighting target lights 16a such that the lighting target lights 16a are lighted in the same lighting mode as the lighting mode before it is determined that the periphery of the vehicle 1 or the remote terminal 12 is dark.

In this embodiment, the term "lighting mode" is a concept indicating how the lights 16 are lighted (in other words, a state of the lights 16 which are lighted), and is substantially equivalent to a lighting state (in other words, lighting condition). In a case where the lighting target lights 16a are changeable in lighting colors, the lighting mode may be the lighting color of the lighting target lights 16a. In this case, the lighting control unit 135 may control the lighting target lights 16a such that the lighting target lights 16a are lighted in a lighting color different from a lighting color before it is determined that the periphery of the vehicle 1 or the remote terminal 12 is dark. In a case where the lighting target lights 16a are lighted to be repeatedly flickered, the lighting mode may a flickering cycle of the lighting target lights 16a. In this case, the lighting control unit 135 may control the lighting target lights 16a such that the lighting target lights 16a are lighted (that is, flickered) in a flickering cycle different from a flickering cycle before it is determined that the periphery of the vehicle 1 or the remote terminal 12 is dark. The lighting mode may be the brightness (for example, illuminance) of the lighting target lights 16a. In this case, the lighting control unit 135 may control the lighting target lights 16a such that the lighting target lights 16a are lighted brighter than before it is determined that the periphery of the vehicle 1 or the remote terminal 12 is dark. In a case where the lighting target lights 16a are lighted brighter than before it is determined that the periphery of the vehicle 1 or the remote terminal 12 is dark, the lighting target lights 16a may be lighted with brightness to such an extent that the user can recognize the vehicle 1 with the help of light of the lighting target lights 16a. As a result, the user can recognize the vehicle 1 in the parking assistance operation with the help of light of the lighting target lights 16a. Alternatively, the lighting mode may be an arbitrary lighting mode different from the lighting color, the flickering cycle, and brightness.

Thereafter, even in the lighting control operation, similarly to the parking assistance operation, the parking assistance unit 133 determines whether or not the end condition is established (Step S28). As a result of the determination in Step S28, in a case where the end condition is not established (Step S28: No), the lighting control unit 135 maintains a state in which the lighting target lights 16a are lighted until it is determined that the end condition is established. As a result of the determination in Step S28, in a case where it is determined that the end condition is established (Step S28: Yes), the lighting control unit 135 turns off the lighting target lights 16a lighted in Step S26 or S271 (Step S29). Thereafter, the ECU 13 ends the lighting control operation shown in FIG. 3.

(3) Technical Effect of Lighting Control Operation

As described above, in the lighting control operation, in a case where it is determined that the vehicle 1 is in the dark environment, the lighting target lights 16a are lighted. For this reason, the vehicle 1 is illuminated directly or indirectly with light emitted from the lighting target lights 16a. Alternatively, even in a case where the lighting target lights 16a are not so bright as the vehicle 1 is illuminated with light emitted from the lighting target lights 16a, the fact remains that the lighting target lights 16a are lighted at a position where the vehicle 1 is present. Accordingly, the user can recognize the vehicle 1 in the parking assistance operation with the help of light of the lighting target lights 16a. Then, since the lights 16 are not lighted with the high beam, the user does not feel glaring due to the high beam.

In addition, as described above, the second brightness information as the detection result of the brightness sensor 122 provided in the remote terminal 12 is equivalent to brightness at a place where the vehicle 1 is supposed to be positioned in the future by the parking assistance operation. For this reason, the brightness determination unit 134 can determine (in other words, predict) that the vehicle 1 which is not in the dark environment at this moment will be in the dark environment in the near future by the parking assistance operation based on the second brightness information. For this reason, even in a case where it is predicted that the vehicle 1 which is in the bright environment at this moment will be moved to the dark environment, the lighting target lights 16a are turned on in advance. Accordingly, even if the vehicle 1 is actually moved from the bright environment to the dark environment, the user can recognize the vehicle 1 moved to the dark environment. As an example where the vehicle 1 in the bright environment is move to the dark environment, an example where the vehicle 1 which is parked in a garage with lighting is moved outside the garage in the nighttime is given. In this case, while the periphery of the vehicle 1 is not relatively dark, if the user operates the remote terminal 12 outside the garage, it is determined that the periphery of the remote terminal 12 is relatively dark (as a result, the vehicle 1 will be moved to the dark environment in the future), and as a result, the lighting target lights 16a are turned on.

(4) Modification Examples of Lighting Control Operation

(4-1) First Modification Example of Lighting Control Operation

Figure 4:
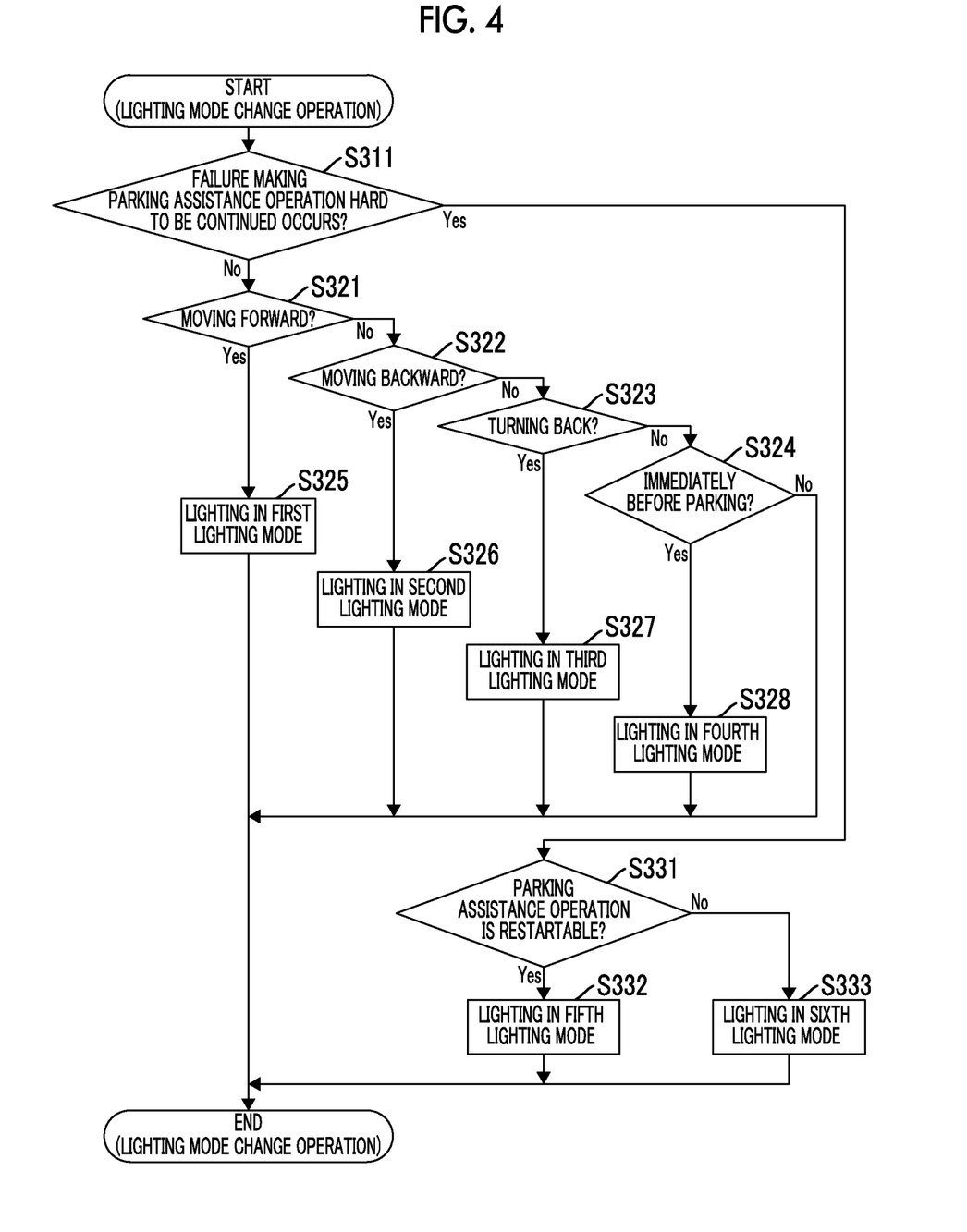
FIG. 4 is a flowchart showing the flow of a lighting mode change operation of a first modification example.

A first modification example of the lighting control operation will be described. The first modification example of the lighting control operation is different from the lighting control operation shown in FIG. 3 in that the lighting mode of the lighting target lights 16a lighted in Step S26 or S271 of FIG. 3 is changed according to the state of the vehicle 1. For this reason, in the first modification example, a flowchart (corresponding to a sub-routine of the lighting control operation) shown in FIG. 4 is performed in parallel with the flowchart (corresponding to a main routine of the lighting control operation) shown in FIG. 3. Hereinafter, the flow of an operation (hereinafter, referred to as a "lighting mode change operation") to change the lighting mode of the lighting target lights 16a according to the state of the vehicle 1 will be described referring to the FIG. 4.

As shown in FIG. 4, the lighting control unit 135 determines whether or not failure making the parking assistance operation hard or unable to be continued occurs in the vehicle 1 (Step S311). That is, the lighting control unit 135 determines whether or not the parking assistance operation ends (or is temporarily stopped) due to failure. The term "failure" used herein has the same meaning as failure for specifying the third condition as one end condition described above. As an example of such failure, failure which occurs in at least one of the camera 111, the brightness sensor 112, the brightness sensor 122, the engine 141, the brake actuator 142, the steering actuator 143, the shift actuator 144, the hydraulic brake device 152, the turning wheels 153, or the gear mechanism 154 is exemplified.

As a result of the determination in Step S311, in a case where it is determined that failure does not occur in the vehicle 1 (Step S311: No), the lighting control unit 135 determines whether or not the vehicle 1 is moving forward (Step S321). As a result of the determination in Step S321, in a case where it is determined that the vehicle 1 is moving forward (Step S321: Yes), the lighting control unit 135 performs control such that the lighting target lights 16a are lighted in a first lighting mode (Step S325). Thereafter, the ECU 13 ends the lighting mode change operation shown in FIG. 4. In a case where the lighting mode change operation shown in FIG. 4 ends, the ECU 13 starts the lighting mode change operation shown in FIG. 4 after a third predetermined period has elapsed.

As a result of the determination in Step S321, in a case where it is determined that the vehicle 1 is not moving forward (Step S321: No), the lighting control unit 135 determines whether or not the vehicle 1 is moving backward (Step S322). As a result of determination in Step S322, in a case where it is determined that the vehicle 1 is moving backward (Step S322: Yes), the lighting control unit 135 performs control such that the lighting target lights 16a are lighted in a second lighting mode different from the first lighting mode (Step S326). Thereafter, the ECU 13 ends the lighting mode change operation shown in FIG. 4.

As a result of determination in Step S322, in a case where it is determined that the vehicle 1 is not moving backward (Step S322: No), the lighting control unit 135 determines whether or not the vehicle 1 is turning back (that is, whether or not the vehicle 1 which is moving forward before is about to start to move backward or the vehicle 1 which is moving backward before is about to start to move forward) (Step S323). As a result of determination in Step S323, in a case where the vehicle 1 is turning back (Step S323: Yes), the lighting control unit 135 performs control such that the lighting target lights 16a are lighted in a third lighting mode different from the first and second lighting modes (Step S327). Thereafter, the ECU 13 ends the lighting mode change operation shown in FIG. 4.

As a result of determination in Step S323, in a case where it is determined that the vehicle 1 is not turning back (Step S323: No), it is estimated that the vehicle 1 is stopped. In this case, the lighting control unit 135 performs control such that the lighting target lights 16a are lighted in a fourth lighting mode different from the first to third lighting modes (Step S328). Thereafter, the ECU 13 ends the lighting mode change operation shown in FIG. 4.

As a result of determination in Step S311, in a case where it is determined that failure occurs in the vehicle 1 (Step S311: Yes), the lighting control unit 135 determines whether or not occurred failure is restorable failure (Step S331). That is, the lighting control unit 135 determines whether or not failure is restored and the parking assistance operation is restartable.

As a result of determination in Step S331, in a case where it is determined that failure is restorable (Step S331: Yes), the lighting control unit 135 performs control such that the lighting target lights 16a are lighted in a fifth lighting mode different from the first to fourth lighting modes (Step S332). As a result of determination in Step S331, in a case where it is determined that failure is not restorable (Step S331: No), the lighting control unit 135 performs control such that the lighting target lights 16a are lighted in a sixth lighting mode different from the first to fifth lighting modes (Step S333).

As described above, the term "lighting mode" is a concept indicating how the lights 16 are lighted (in other words, a state of the lights 16 which are lighted), and is substantially equivalent to a lighting state (in other words, lighting condition). In a case where the lighting mode is the lighting color, the lighting target lights 16a are lighted in the lighting color according to the state of the vehicle 1. In a case where the lighting mode is the flickering cycle, the lighting target lights 16a are lighted (that is, flickered) in the flickering cycle according to the state of the vehicle 1. In a case where the lighting mode is brightness, the lighting target lights 16a are lighted with brightness according to the state of the vehicle 1.

According to the first modification example described above, the user can comparatively easily recognize the state of the vehicle 1 based on the lighting mode of the lighting target lights 16a. In the example shown in FIG. 4, the user can comparatively recognize whether the vehicle 1 is moving forward, moving backward, turning back, or stopped in a situation in which failure does not occur. In addition, in the example shown in FIG. 4, the user can comparatively easily recognize whether or not the parking assistance operation is restartable in a situation in which failure occurs.

The user can monitor whether or not the vehicle 1 is appropriately moved by the parking assistance operation. In addition, since it is possible to recognize how the vehicle 1 is moved, the user can recognize the vehicle 1 at an appropriate position such that the movement of the vehicle 1 is not dangerous to the user.

FIG. 4 shows an example where the lighting mode of the lighting target lights 16a is set to any of the six lighting modes. That is, FIG. 4 shows an example whether the number of types of the state of the vehicle 1 which can be distinguished by the lighting mode of the lighting target lights 16a is six. However, the number of lighting modes set in the lighting target lights 16a (that is, the number of types of the state of the vehicle 1 which can be distinguished by the lighting mode) may be equal to or less than five, or may be equal to or greater than seven.

(3-2) Second Modification Example of Lighting Control Operation

Figure 5:
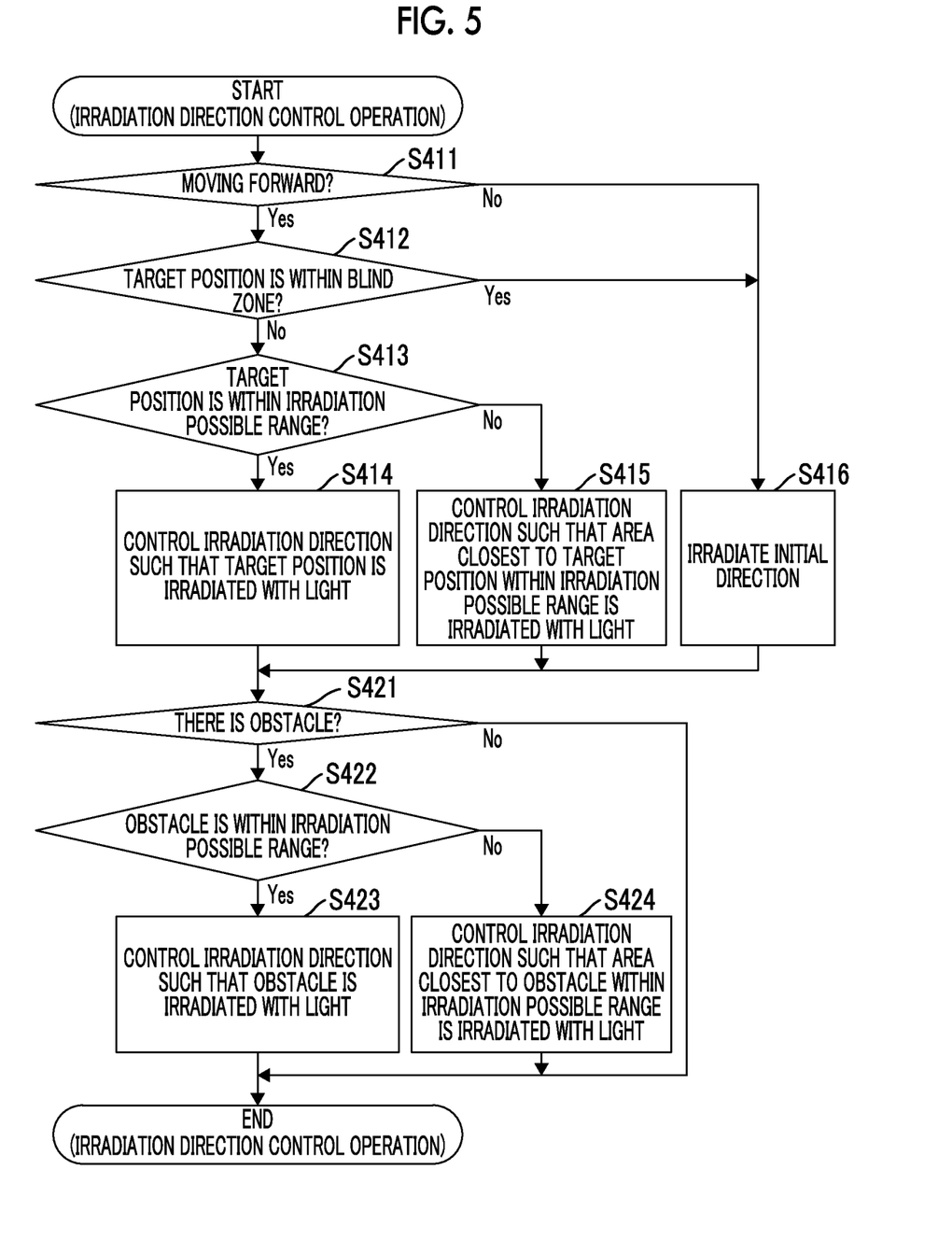
FIG. 5 is a flowchart showing the flow of an irradiation direction control operation of a second modification example.

A second modification example of the lighting control operation will be described. The second modification example of the lighting control operation is different from the lighting control operation shown in FIG. 3 in that the irradiation direction of light from the lighting target lights 16a lighted in Step S26 or S271 of FIG. 3 is controlled. In particular, in the second modification example, the irradiation direction of light from the lighting target lights 16a is controlled (in other words, regulated or changed) such that the lighting target lights 16a irradiate at least one of the target position or an obstacle with light. For this reason, in the second modification example, a flowchart (corresponding to a sub-routine of the lighting control operation) shown in FIG. 5 is performed in parallel with the flowchart (corresponding to a main routine of the lighting control operation) shown in FIG. 3. Hereinafter, the flow of an operation (hereinafter, referred to as an "irradiation direction control operation") to control the irradiation direction of light from the lighting target lights 16a will be described referring to FIG. 5.

In the following description, description will be provided assuming that the lighting target lights 16a are the headlights 161. In this case, it is assumed that the headlights 161 are headlights corresponding to an adaptive front-light system (AFS) capable of regulating the irradiation direction of light. However, arbitrary lights different from the headlights 161 is applicable to the second modification example of the lighting control operation as long as the irradiation direction of light can be regulated.

As shown in FIG. 5, the lighting control unit 135 determines whether or not the vehicle 1 is moving forward (Step S411). As a result of determination in Step S411, in a case where it is determined that the vehicle 1 is not moving forward (Step S411: No), the lighting control unit 135 does not change the irradiation direction of light from the headlights 161 from an initial direction corresponding to a default irradiation direction. The reason is as follows. Since the vehicle 1 is not moving forward, there is a high possibility that the target position is not present in front of the vehicle 1, and as a result, the target position is hard to be irradiated with light from the headlights 161 which irradiate the front of the vehicle 1 with light. In addition, while the headlights 161 which irradiate the front of the vehicle 1 with light can irradiate an obstacle positioned in front of the vehicle 1 with light, since the vehicle 1 is not moving forward, there is less possibility that the obstacle in front of the vehicle 1 obstructs the movement of the vehicle 1, and as a result, the necessity of making the user pay attention by irradiating the obstacle with light is small. Accordingly, in this case, the lighting control unit 135 controls the headlights 161 such that the headlights 161 emit light in the initial direction (Step S416).

Figure 6:
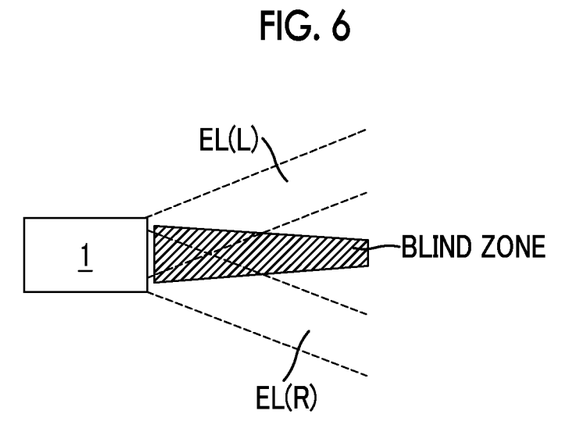
FIG. 6 is a plan view showing a blind zone which is set in front of the vehicle.

As a result of determination in Step S411, in a case where it is determined that the vehicle 1 is moving forward (Step S411: Yes), the lighting control unit 135 determines whether or not the target position is within a blind zone set in advance in front of the vehicle 1 (Step S412). As shown in FIG. 6, the blind zone is set as an area extending from the vehicle 1 toward the front in front of the vehicle 1. As shown in FIG. 6, the blind zone includes at least a part of an area where a range EL(R) of irradiation of light from the right light on the right side of the vehicle 1 out of the headlights 161 of the vehicle 1 are a range EL(L) of irradiation of light from the left light on the left side of the vehicle 1 out of the headlights 161 overlap each other.

As a result of determination in Step S412, in a case where it is determined that the target position is within the blind zone (Step S412: Yes), the lighting control unit 135 does not change the irradiation direction of light from the headlights 161 from the initial direction. This is because, in this case, there is a high possibility that the headlights 161 already irradiate the target position with light. Accordingly, in this case, the lighting control unit 135 controls the headlights 161 such that the headlights 161 emit light in the initial direction (Step S416).

As a result of determination in Step S412, in a case where it is determined that the target position is not within the blind zone (Step S412: No), the lighting control unit 135 determines whether or not the target position is within an irradiation possible range in which the headlights 161 can irradiate the target position with light (that is, light emitted from the headlights 161 can reach) (Step S413). The term "irradiation possible range" used herein means a range in which the headlights 161 can emit light in a situation in which control of the irradiation direction is permitted.

As a result of determination in Step S413, in a case where it is determined that the target position is within the irradiation possible range (Step S413: Yes), the lighting control unit 135 controls the irradiation direction of light from the headlights 161 such that the headlights 161 irradiate the target position with light (Step S414). As a result, the irradiation direction of light from the headlights 161 coincides with the direction in which the target position is present. For this reason, the headlights 161 irradiate the target position with light. As a result of determination in Step S413, in a case where it is determined that the target position is not within the irradiation possible range (Step S413: No), the headlights 161 cannot directly irradiate the target position with light. In this case, the lighting control unit 135 controls the irradiation direction of light from the headlights 161 such that the headlights 161 irradiate a first area closest to the target position out of the irradiation possible range with light (Step S415). As a result, the headlights 161 do not directly irradiate the target position with light, but irradiate the first area relatively close to the target position with light.

As described above, the headlights 161 includes the right light and the left light. In this case, both of the right light and the left light may irradiate the target position (or the first area closest to the target position out of the irradiation possible range; hereinafter, the same applies in this paragraph) with light. Alternatively, while one of the right light and the left light may irradiate the target position with light, the other light of the right light and the left light may not irradiate the target position with light. In this case, it is preferable that one light close to the target position out of the right light and the left light irradiates the target position with light.

Thereafter, the lighting control unit 135 determines whether or not there is an obstacle in a traveling direction of the vehicle 1 (Step S421). The lighting control unit 135 analyzes image information as the imaging result of the camera 111, thereby determining whether or not there is an obstacle in the traveling direction of the vehicle 1.

As a result of determination in Step S421, in a case where it is determined that there is an obstacle (Step S421: Yes), the lighting control unit 135 determines whether or not the obstacle is within the irradiation possible range (Step S422). As a result of determination in Step S422, in a case where it is determined that the obstacle is within the irradiation possible range (Step S422: Yes), the lighting control unit 135 controls the irradiation direction of light from the headlights 161 such that the headlights 161 irradiate the obstacle with light (Step S423). As a result of determination in Step S422, in a case where it is determined that the obstacle is not within the irradiation possible range (Step S422: No), the lighting control unit 135 controls the irradiation direction of light from the headlights 161 such that the headlights 161 irradiate a second area closest to the obstacle out of the irradiation possible range with light (Step S423).

As a result of determination in Step S421, in a case where it is determined that there is no obstacle (Step S421: No), the lighting control unit 135 does not perform the processing of Steps S423 and S424.

As described above, the headlights 161 include the right light and the left light. In this case, both of the right light and the left light may irradiate the obstacle (or the second area closest to the obstacle out of the irradiation possible range; hereinafter, the same applies in this paragraph) with light. Alternatively, while one of the right light and the left light may irradiate the obstacle with light, the other light of the right light and the left light may not irradiate the obstacle with light. In this case, it is preferable that one light close to the obstacle out of the right light and the left light irradiates the obstacle with light.

Figure 7:
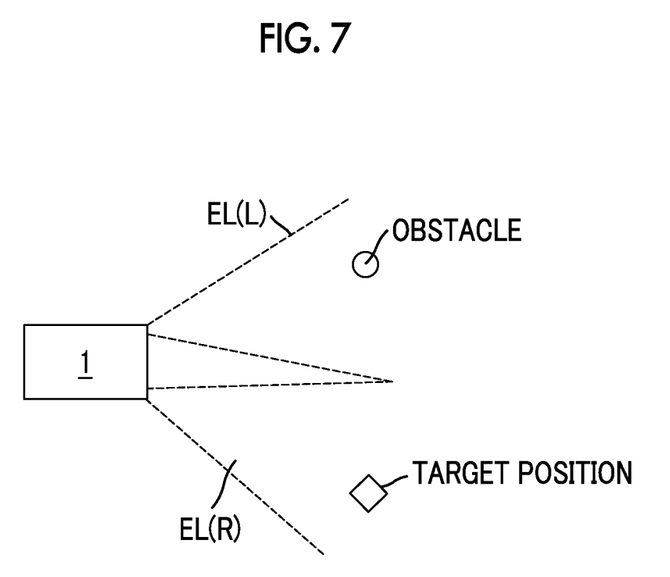
FIG. 7 is a plan view showing the vehicle which irradiates both of a target position and an obstacle with light.

The headlights 161 may irradiate both of the target position and the obstacle with light. In this case, as shown in FIG. 7, it is preferable that one light (in an example shown in FIG. 7, the right light) close to the target position out of the right light and the left light irradiates the target position with light, and the other light (in the example shown in FIG. 7, the left light) close to the obstacle out of the right light and the left right irradiates the obstacle with light.

As described above, according to the second modification example, the user can recognize where the target position is present based on the irradiation direction of light from the lighting target lights 16a. In addition, since the lighting target lights 16a irradiate the obstacle with light, the user can recognize the presence of the obstacle as well as the vehicle 1. Accordingly, the user can stop the parking assistance operation in order to avoid collision of the vehicle 1 and the obstacle as necessary.

The lighting control unit 135 may control the irradiation direction of light from the headlights 161 such that the headlights 161 irradiate via-positions, through which the vehicle 1 passes for movement to the target position, with light, in addition to or instead of the target position. As an example of the via-positions, a position where the vehicle 1 is temporarily stopped, a position where the vehicle 1 turns back, or the like is exemplified.

(4-3) Other Modification Examples of Lighting Control Operation

In the above description, the lighting control unit 135 executes the control for inhibiting the lighting of the headlights 161 with the high beam (Step S22 of FIG. 3) before lighting the lighting target lights 16a in the lighting control operation (Step S26 or S271 of FIG. 3). However, the lighting control unit 135 may perform control of lighting the lighting target lights 16a, without performing the lighting of the headlights 161 with the high beam, in a case of lighting the lighting target lights 16a (Step S26 or S271 of FIG. 3), instead of executing the control for inhibiting the lighting of the headlights 161 with the high beam. For example, the headlights 161 may be turned on with the low beam. The headlights 161 may not be turned on, and only the parking lights 162 or the interior lights 163 may be turned on. In this way, even in a case where the control for initiatively inhibiting the lighting of the headlights 161 with the high beam is not performed, since the fact remains that the lighting of the headlights 161 with the high beam is not performed, the above-described effects can be appropriately provided.

In the above description, in Step S26 of FIG. 3, the lighting target lights 16a are newly turned on. In a case where there are a plurality of lighting target lights 16a, a plurality of lighting target lights 16a may be turned on simultaneously. Alternatively, a plurality of lighting target lights 16a may be turned in sequence. For example, in a stage in which the vehicle 1 is not actually moved by the parking assistance operation, first lighting target lights 16a (for example, parking lights 162) are turned on, and then, after the vehicle 1 starts to be actually moved by the parking assistance operation, second lighting target lights 16a (for example, at least one of the headlights 161 or the interior lights 163) may be turned on.

In the above description, through the processing of Steps S272 and S273 of FIG. 3, the lighting target lights 16a are lighted in a lighting mode different from a lighting mode before it is determined that the periphery of the vehicle 1 or the remote terminal 12 is dark. However, even in a case where it is determined that the periphery of the vehicle 1 or the remote terminal 12 is dark, the lighting target lights 16a may remain lighted in the lighting mode before it is determined that the periphery of the vehicle 1 or the remote terminal 12 is dark. That is, the processing of Steps S272 and S273 of FIG. 3 may not be performed.

In the above description, in Step S29 of FIG. 3, the lighting target lights 16a are turned off. In a case where there are a plurality of lighting target lights 16a, a plurality of lighting target lights 16a may be turned off simultaneously. Alternatively, a plurality of lighting target lights 16a may be turned off in sequence. For example, when it is determined that the end condition is established, third lighting target lights 16a (for example, at least one of the headlights 161 or interior lights 163) may be turned off, and when the user accepts the end of the parking assistance operation, fourth lighting target lights 16a (for example, the parking lights 162) may be turned off. In addition, thereafter, when an ignition key is turned off, all lights 16 are turned off.

In the above description, the lighting of the lighting target lights 16a by the lighting control operation is primarily intended to make the user who requests the execution of the parking assistance operation using the remote terminal 12 appropriately recognize the vehicle 1. However, the lighting of the lighting target lights 16a by the lighting control operation can make a person who is around the vehicle 1 and does not request the execution of the parking assistance operation appropriately recognize the vehicle 1. That is, the lighting of the lighting target lights 16a by the lighting control operation can make all people who are around the vehicle 1 appropriately recognize the vehicle 1.

In a case where the vehicle 1 is provided with the brightness sensor 112, the remote terminal 12 may not be provided with the brightness sensor 122. In a case where the remote terminal 12 is provided with the brightness sensor 122, the vehicle 1 may not be provided with the brightness sensor 112.

In the above description, the periphery recognition unit 131 recognizes the situation in the periphery of the vehicle 1 based on the imaging result of the camera 111. However, the periphery recognition unit 131 may recognize the situation in the periphery of the vehicle 1 based on other kinds of information, in addition to or instead of the imaging result of the camera 111. For example, in a case where the vehicle 1 is provided with an arbitrary detection device (for example, a millimeter-wave radar, a Lidar, a sonar, or the like) which can detect the situation in the periphery of the vehicle 1, the periphery recognition unit 131 may recognize the situation in the periphery of the vehicle 1 based on a detection result of the arbitrary detection device.

The embodiment of the present disclosure can be appropriately changed without departing from the scope and spirit of the present disclosure that can be read from the entire specification, and parking assistance devices involving such changes are also included in the technical scope of the present disclosure.

What is claimed is:

1. A parking assistance device comprising:
    at least one electronic control unit configured to:
        execute parking assistance according to an operation from a user that requests the parking assistance, such that a vehicle is automatically parked at a target position,
        after the parking assistance is requested, inhibit lighting of a high beam of a headlight of the vehicle,
        determine whether or not the vehicle is in a predetermined environment, the predetermined environment being darker than a predetermined brightness level, and
        when the at least one electronic control unit determines that the vehicle is in the predetermined environment, control a lighting device, which includes the headlight, such that the headlight is lighted with a low beam without performing lighting with the high beam, while the parking assistance is executed, the lighting device being provided in the vehicle.

2. The parking assistance device according to claim 1, wherein
    the at least one electronic control unit is configured to, while the parking assistance is executed, control the lighting device such that the lighting device is newly turned on, the lighting device not being turned on before the at least one electronic control unit determines that the vehicle is in the predetermined environment.

3. The parking assistance device according to claim 1, wherein
    the at least one electronic control unit is configured to, while the parking assistance is executed, control the lighting device such that the lighting device is lighted in a second lighting mode, the second lighting mode being different from a first lighting mode, the first lighting mode is performed before the at least one electronic control unit determines that the vehicle is in the predetermined environment, when the lighting device is already turned on before the at least one electronic control unit determines that the vehicle is in the predetermined environment.

4. The parking assistance device according to claim 1, wherein
the at least one electronic control unit is configured to, while the parking assistance is executed, control the lighting device such that the lighting device irradiates, with light, the target position or a position where the vehicle passes by a time at which the vehicle arrives at the target position.

5. The parking assistance device according to claim 1, wherein
the at least one electronic control unit is configured to, while the parking assistance is executed, control the lighting device such that the lighting device irradiates an obstacle with light, the obstacle being positioned on a traveling route of the vehicle or near the traveling route, the traveling route being a route where the vehicle moves on by a time at which the vehicle arrives at the target position.

6. The parking assistance device according to claim 1, wherein
the at least one electronic control unit is configured to, while the parking assistance is executed, control the headlight such that the headlight is lighted when the vehicle is moving, and control the headlight such that the headlight is not lighted when the vehicle is not moving.

7. The parking assistance device according to claim 1, wherein
the at least one electronic control unit is configured to, while the parking assistance is executed, control the lighting device such that a lighting mode of the lighting device is changed according to a state of the vehicle, during a period in which the lighting device is lighted due to a determination that the vehicle is in the predetermined environment.

8. The parking assistance device according to claim 7, wherein
the lighting mode includes at least one of lighting color, flickering cycle, and brightness of the lighting device.

9. A parking assistance device comprising:
a remote terminal configured to communicate with the at least one electronic control unit from an outside of a vehicle, wherein the remote terminal includes a sensor configured to detect brightness in a periphery of the remote terminal; and the at least one electronic control unit is configured to:
execute parking assistance according to an operation front a user on the remote terminal, such that the vehicle is automatically parked at a target position, by communicating with the remote terminal;
determine, based on a detection result of a vehicle sensor, whether or not the vehicle is in a redetermined environment that is darker than a predetermined brightness level;
determine, based on a detection result of the remote terminal sensor, whether or not the remote terminal is in a predetermined environment that is darker than the predetermined brightness level; and
based on a determination result that at least one of the vehicle or the remote terminal is in the predetermined environment that is darker than the predetermined brightness level, control a lighting device such that the lighting device is lighted without performing lighting with a high beam, while the parking assistance is executed, the lighting device being provided in the vehicle.

* * * * *